(12) United States Patent
Hamano

(10) Patent No.: US 7,088,522 B2
(45) Date of Patent: Aug. 8, 2006

(54) ZOOM LENS SYSTEM

(75) Inventor: Hiroyuki Hamano, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 11/040,850

(22) Filed: Jan. 20, 2005

(65) Prior Publication Data

US 2005/0168832 A1   Aug. 4, 2005

(30) Foreign Application Priority Data

Jan. 30, 2004   (JP)   ............................. 2004-022741

(51) Int. Cl.
*G02B 15/14*   (2006.01)
(52) U.S. Cl. ..................................... 359/687
(58) Field of Classification Search ................. 359/687
See application file for complete search history.

(56) References Cited

U.S. PATENT DOCUMENTS

| 5,179,472 | A | 1/1993 | Ohno et al. |
| 5,963,378 | A | 10/1999 | Tochigi et al. |
| 6,166,864 | A | 12/2000 | Horiuchi |
| 6,456,441 | B1 | 9/2002 | Hoshi |

FOREIGN PATENT DOCUMENTS

| JP | 06148520 A | * | 5/1994 |
| JP | 7-270684 A | | 10/1995 |
| JP | 11-305124 A | | 11/1999 |
| JP | 2001-194586 A | | 7/2001 |
| JP | 3352240 B2 | | 9/2002 |

* cited by examiner

Primary Examiner—Timothy Thompson
Assistant Examiner—William Choi
(74) Attorney, Agent, or Firm—Morgan & Finnegan, LLP

(57) ABSTRACT

A zoom lens system is disclosed, in which the decrease of the peripheral light quantity at the wide-angle end is improved. The zoom lens system comprises, in order from an object side to an image side, a first lens unit having a positive optical power, a second lens unit having a negative optical power, an aperture stop, a third lens unit having a positive optical power and a fourth lens unit having a positive optical power. The four lens units and the aperture stop are moved during zooming. When MS represents movement amount of the aperture stop during zooming from the wide-angle end to the telephoto end and M3 represents the maximum movement amount of the third lens unit in the optical axis direction during zooming from the wide-angle end to the telephoto end, $-1.8 < MS/M3 < -0.5$ is satisfied.

14 Claims, 9 Drawing Sheets

ZOOM LENS SYSTEM

BACKGROUND OF THE INVENTION

1. Field of the Invention

The present invention relates to a zoom lens system suitable for, for instance, image-taking apparatuses such as video cameras, digital still cameras and silver halide cameras.

2. Description of the Related Art

Recently, remarkable advancement of the miniaturization of zoom lenses for image-taking, which is associated with the miniaturization and weight reduction of home video cameras, etc., is seen, and especially, shortening the total length of the lens system, miniaturizing the front lens diameter and simplifying the lens composition are attempted.

As one of means to achieve these purposes, a so-called rear focus type zoom lens is known, in which a lens unit other than the first lens unit on the object side is moved for focusing.

Generally, in the rear focus type zoom lens, an effective diameter of the first lens unit is small as compared with a zoom lens in which the first lens unit is moved for focusing, and it is easy to miniaturize the entire system of the rear focus type zoom lens. Moreover, close image-taking, especially, very close image-taking becomes easy. In addition, there are features such as a possibility of rapid focusing, etc. since the driving power of the lens unit can be small by the miniaturization and weight reduction of the lens unit.

Conventional zoom lenses of the rear focus type have four lens units comprising, in order from the object side to the image side, a first lens unit having a positive refractive power, a second lens unit having a negative refractive power, a third lens unit having a positive refractive power and a fourth lens unit having a positive refractive power. In the zoom lenses, the second lens unit is moved for varying the magnification, and the fourth lens unit is moved for compensating the image plane fluctuation associated with the variation of magnification and for focusing (see Patent Documents 1 and 2 described below).

Moreover, zoom lenses are known, which have four lens units comprising, in order from the object side to the image side, a first lens unit having a positive refractive power, a second lens unit having a negative refractive power, a third lens unit having a positive refractive power and a fourth lens unit having a positive refractive power, wherein the second, third and fourth lens units are moved for zooming (see Patent Document 3 described below).

Moreover, zoom lenses are known, which have four lens units comprising, in order from the object side to the image side, a first lens unit having a positive refractive power, a second lens unit having a negative refractive power, a third lens unit having a positive refractive power and a fourth lens unit having a positive refractive power, wherein the first, second, third and fourth lens units are moved for zooming (see Patent Document 4 described below).

Furthermore, zoom lenses are known, which have four lens units comprising, in order from the object side to the image side, a first lens unit having a positive refractive power, a second lens unit having a negative refractive power, a third lens unit having a positive refractive power and a fourth lens unit having a positive refractive power, wherein the first, second, third and fourth lens units are moved for zooming, and the miniaturization of the total length of the zoom lens and the reduction of the front lens diameter are attempted by independently moving the aperture stop (see Patent Document 5 described below).

[Patent Document 1]
Japanese Laid-Open Patent Application No. H07-270684 (corresponding to U.S. Pat. No. 5,963,378)

[Patent Document 2]
Japanese Laid-Open Patent Application No. H11-305124 (corresponding to U.S. Pat. No. 6,166,864)

[Patent Document 3]
Japanese Patent No. 2879463 (corresponding to U.S. Pat. No. 5,179,472)

[Patent Document 4]
Japanese Laid-Open Patent Application No. 2001-194586 (corresponding to U.S. Pat. No. 6,456,441)

[Patent Document 5]
Japanese Patent No. 3352240

In the zoom lens disclosed by Patent Document 3, it is difficult to miniaturize the front lens diameter since the movement track of the third lens unit for zooming is a track convex towards the image side.

Moreover, in the zoom lens disclosed by Patent Document 4, it is difficult to obtain a high zoom ratio since the first lens unit is a single lens, and the refractive power of the first and second lenses are not so large.

Moreover, in the zoom lens disclosed by Patent Document 5, it is difficult to miniaturize the front lens diameter since the movement tracks of lens units for zooming are not necessarily the best.

In general, in a case where the sufficient light quantity in the peripheral area of the image plane is secured in four-unit-zoom lenses constituted by a first lens unit having a positive refractive power, a second lens unit having a negative refractive power, a third lens unit having a positive refractive power, a fourth lens unit having a positive refractive power and a stop arranged near the third lens unit, there is little decrease in the peripheral light quantity in an area up to about the 80 percent height position of the peripheral area in the image plane, but there is a steep decrease in the peripheral light quantity in an outer area (peripheral portion) from about the 80 percent height position in the image plane. Therefore, there is a problem that the decrease of the peripheral light quantity stands out.

SUMMARY OF THE INVENTION

An object of the present invention is to provide a zoom lens system in which the decrease of the peripheral light quantity at the wide-angle end is improved and its optical performance in the entire zoom range from the wide-angle end to the telephoto end is excellent.

One aspect of the present invention is a zoom lens system comprising, in order from an object side to an image side, a first lens unit having a positive optical power (the optical power means the reciprocal of the focal length), a second lens unit having a negative optical power, an aperture stop, a third lens unit having a positive optical power and a fourth lens unit having a positive optical power. The first, second, third and fourth lens units are moved during zooming, the aperture stop is moved so as to be located at a position closer to the image side at a telephoto end than at a wide-angle end. Furthermore the following condition is satisfied:

$$-1.8 < MS/M3 < -0.5$$

where MS and M3 represent the maximum movement amounts (the direction towards from the object side to the image side is assumed to be positive) of the aperture stop and the third lens unit in a direction of an optical axis during zooming from the wide-angle end to the telephoto end, respectively.

Another aspect of the present invention is a zoom lens system comprising, in order from an object side to an image side, a first lens unit having a positive optical power, a second lens unit having a negative optical power, an aperture stop, a third lens unit having a positive optical power and a fourth lens unit having a positive optical power. During zooming from a wide-angle end to a telephoto end, the aperture stop is moved to the image side, and the third lens unit is moved along a track convex towards the object side. Furthermore, the following condition is satisfied:

$$-1.8 < MS/M3 < -0.5$$

where MS and M3 represent the maximum movement amounts of the aperture stop and the third lens unit in a direction of an optical axis during zooming from the wide-angle end to the telephoto end, respectively.

Other objects and further features of the present invention will become readily apparent from the following description of the preferred embodiments with reference to accompanying drawings.

DETAILED DESCRIPTION OF THE PREFERRED EMBODIMENTS

Hereinafter, a zoom lens system and an image-taking apparatus using the same of preferred embodiments of the present invention will be concretely described with referent to the drawings.

Figure 1:
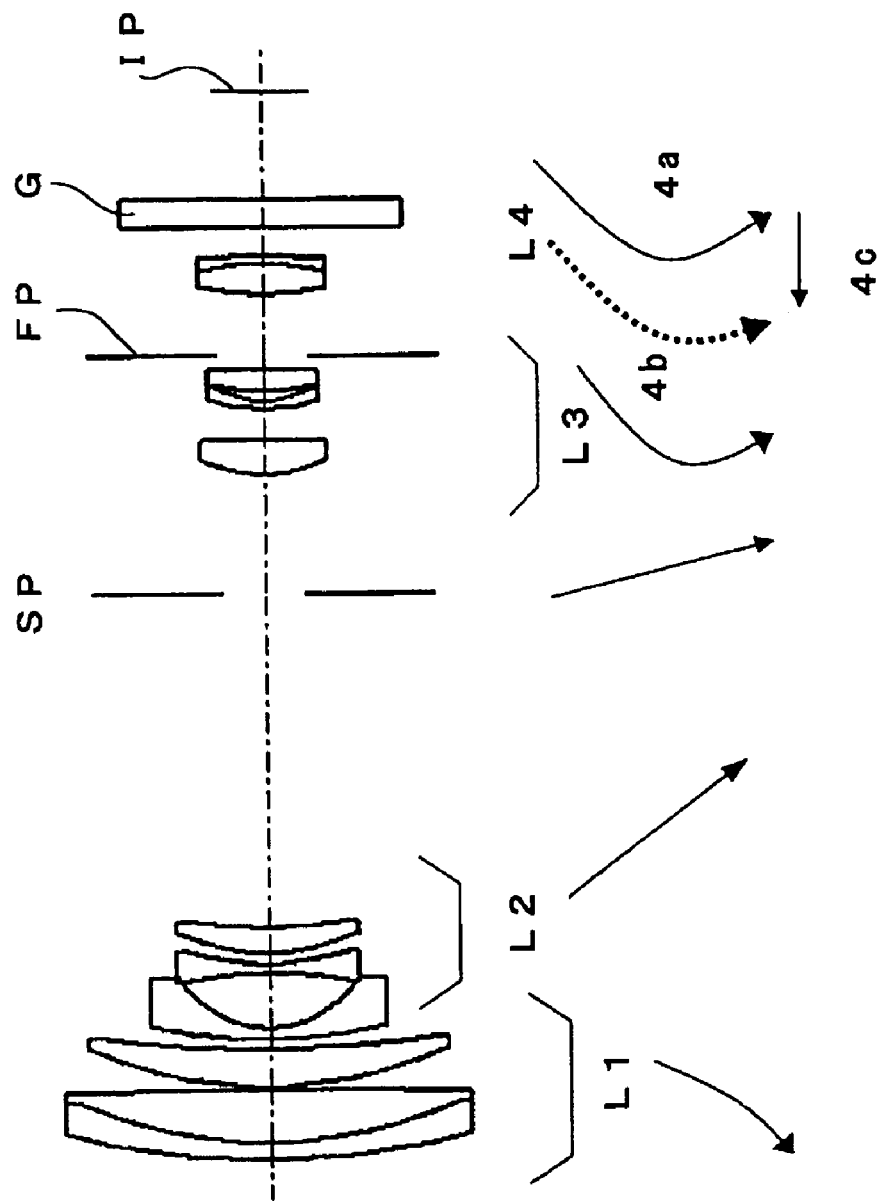
FIG. 1 is a section view showing the zoom lens at the wide-angle end in Embodiment 1.
Figure 2:
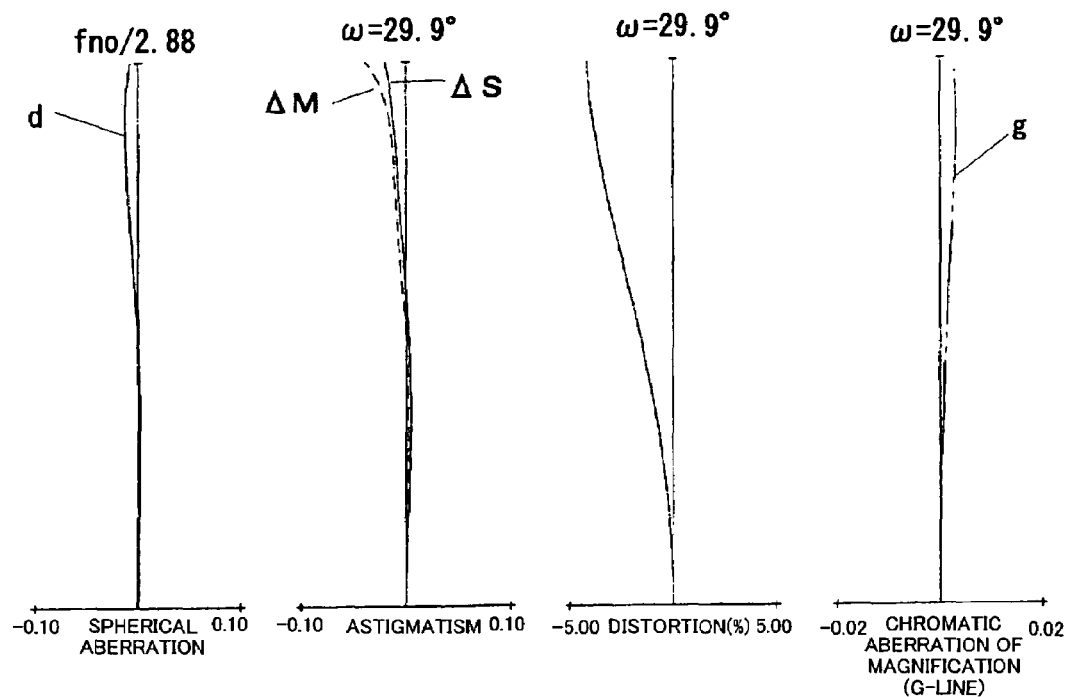
FIG. 2 shows various aberration charts of the zoom lens at the wide-angle end in Embodiment 1.
Figure 3:
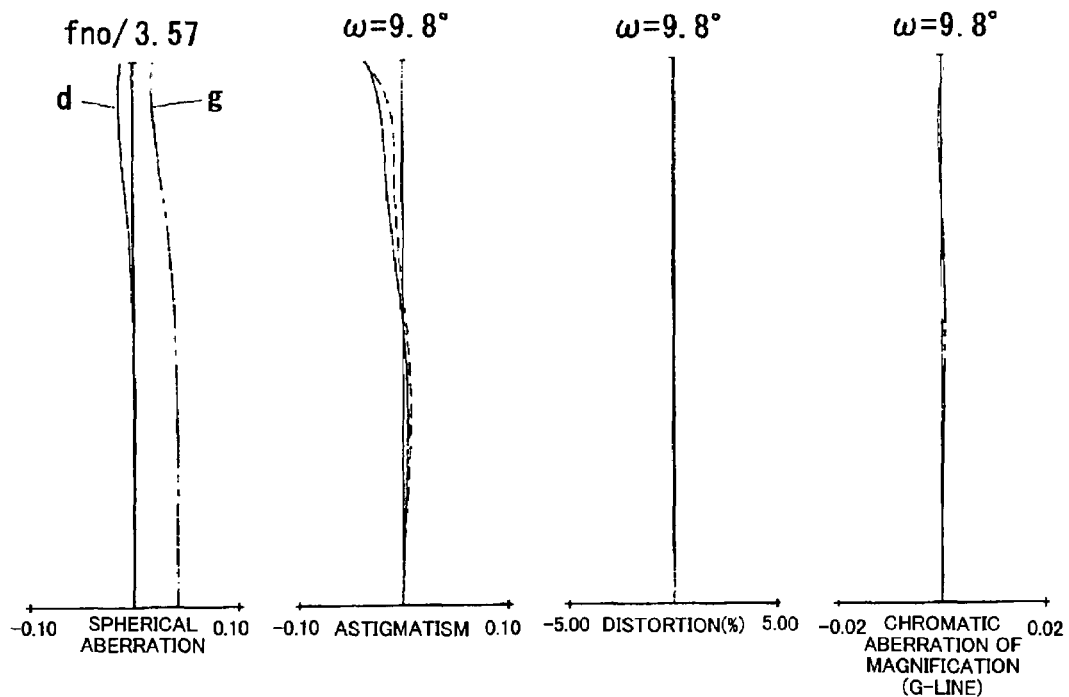
FIG. 3 shows various aberration charts of the zoom lens at the middle zoom position in Embodiment 1.
Figure 4:
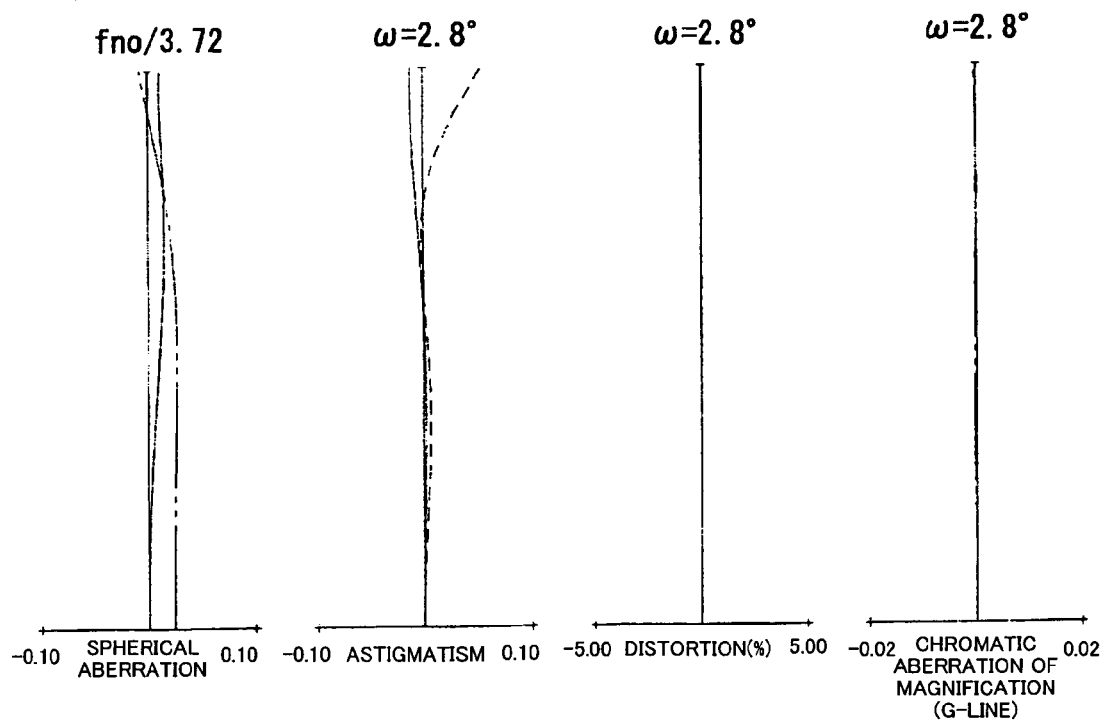
FIG. 4 shows various aberration charts of the zoom lens at the telephoto end in Embodiment 1.

FIG. 1 is a section view of the zoom lens at the wide-angle end in Embodiment 1 of the present invention, and FIGS. 2 to 4 show aberration charts of the zoom lens in Embodiment 1 at the wide-angle end, at the middle focal length and at the telephoto end.

Figure 5:
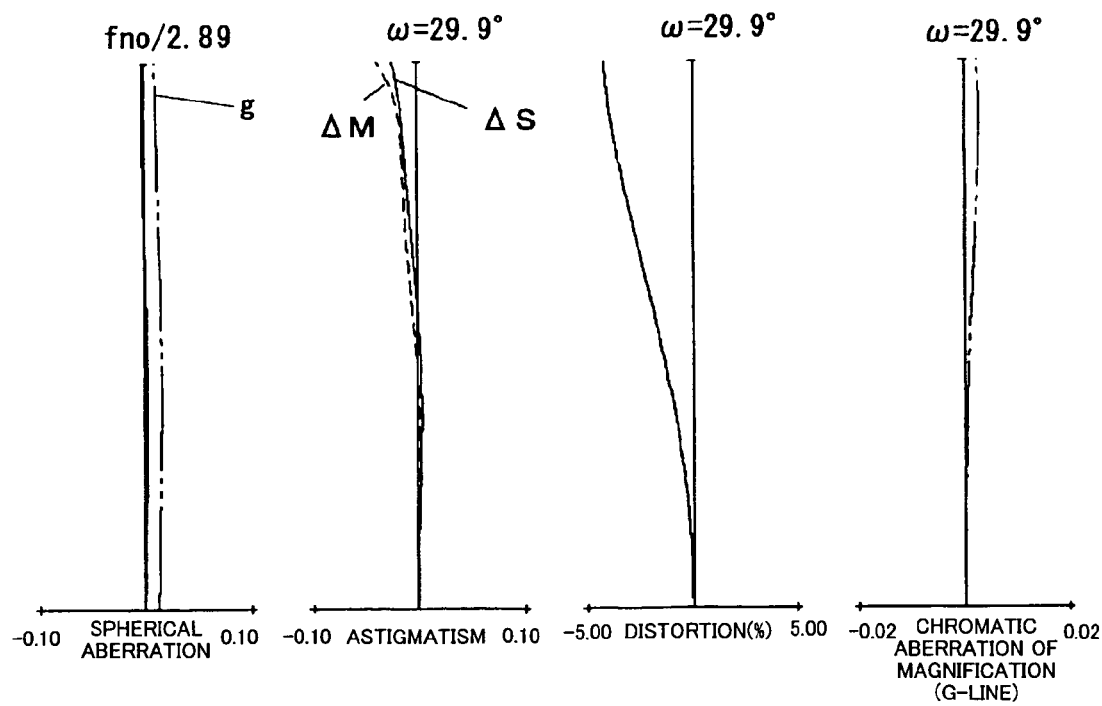
FIG. 5 shows various aberration charts of the zoom lens at the wide-angle end in Embodiment 2.
Figure 6:
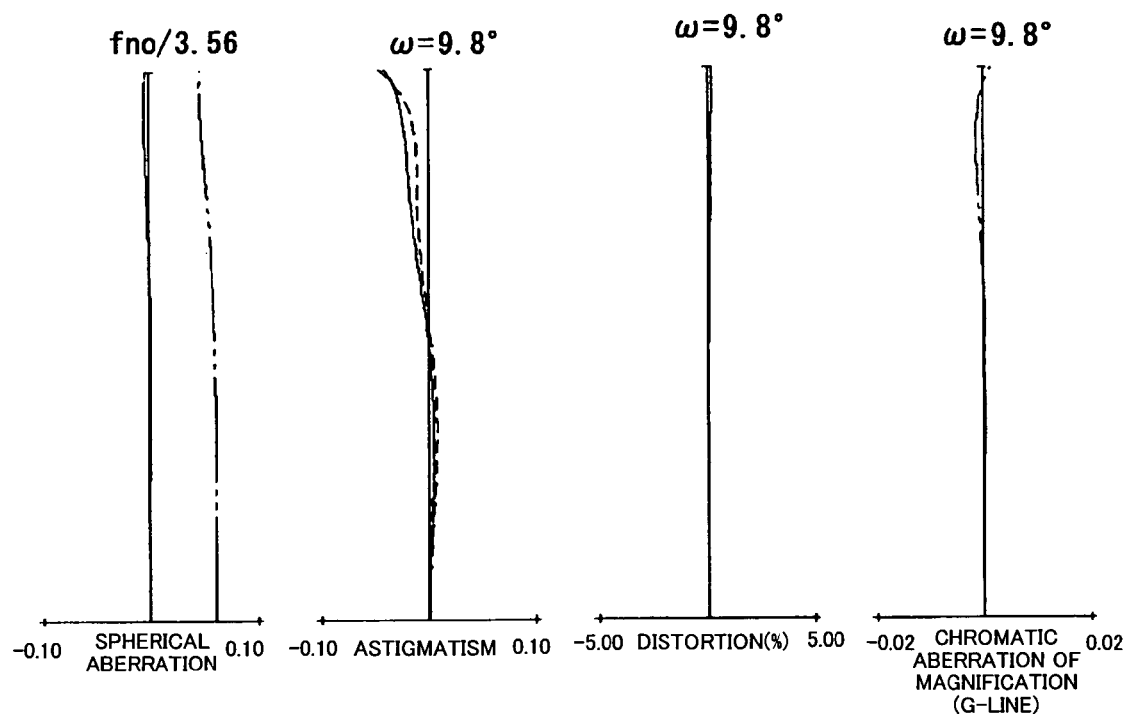
FIG. 6 shows various aberration charts of the zoom lens at the middle zoom position in Embodiment 2.
Figure 7:
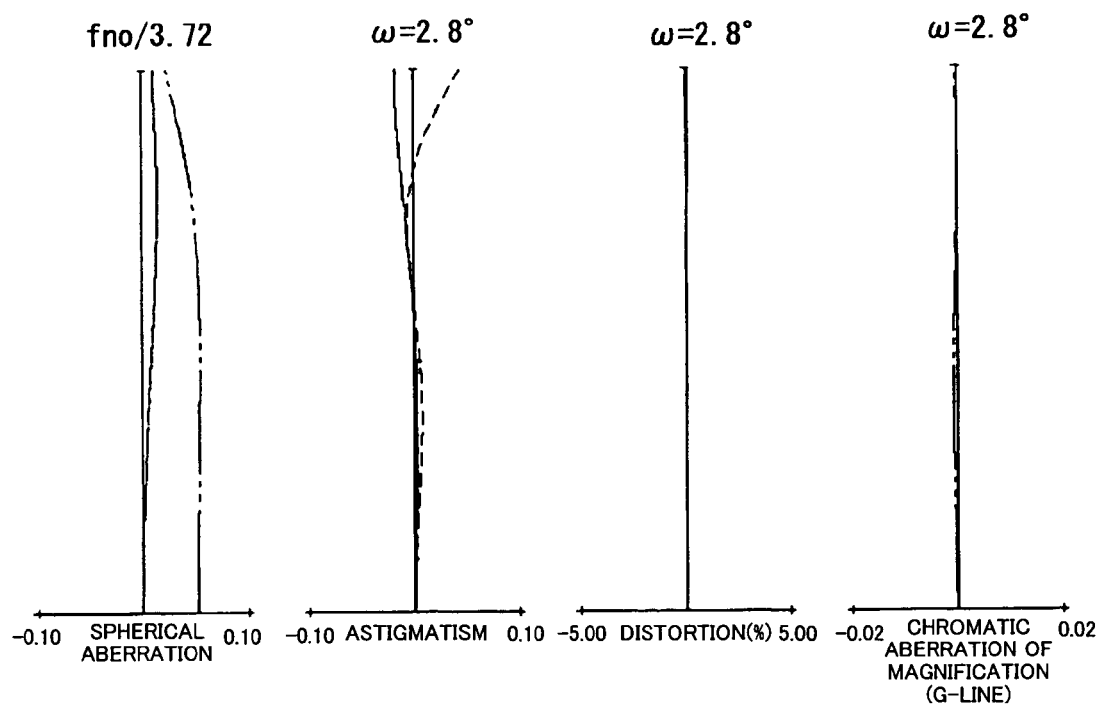
FIG. 7 shows various aberration charts of the zoom lens at the telephoto end in Embodiment 2.

FIGS. 5 to 7 show aberration charts of the zoom lens in Embodiment 2 of the present invention at the wide-angle end, at the middle focal length and at the telephoto end. The section view of the zoom lens in Embodiment 2 is omitted because it is almost the same as Embodiment 1.

Figure 8:
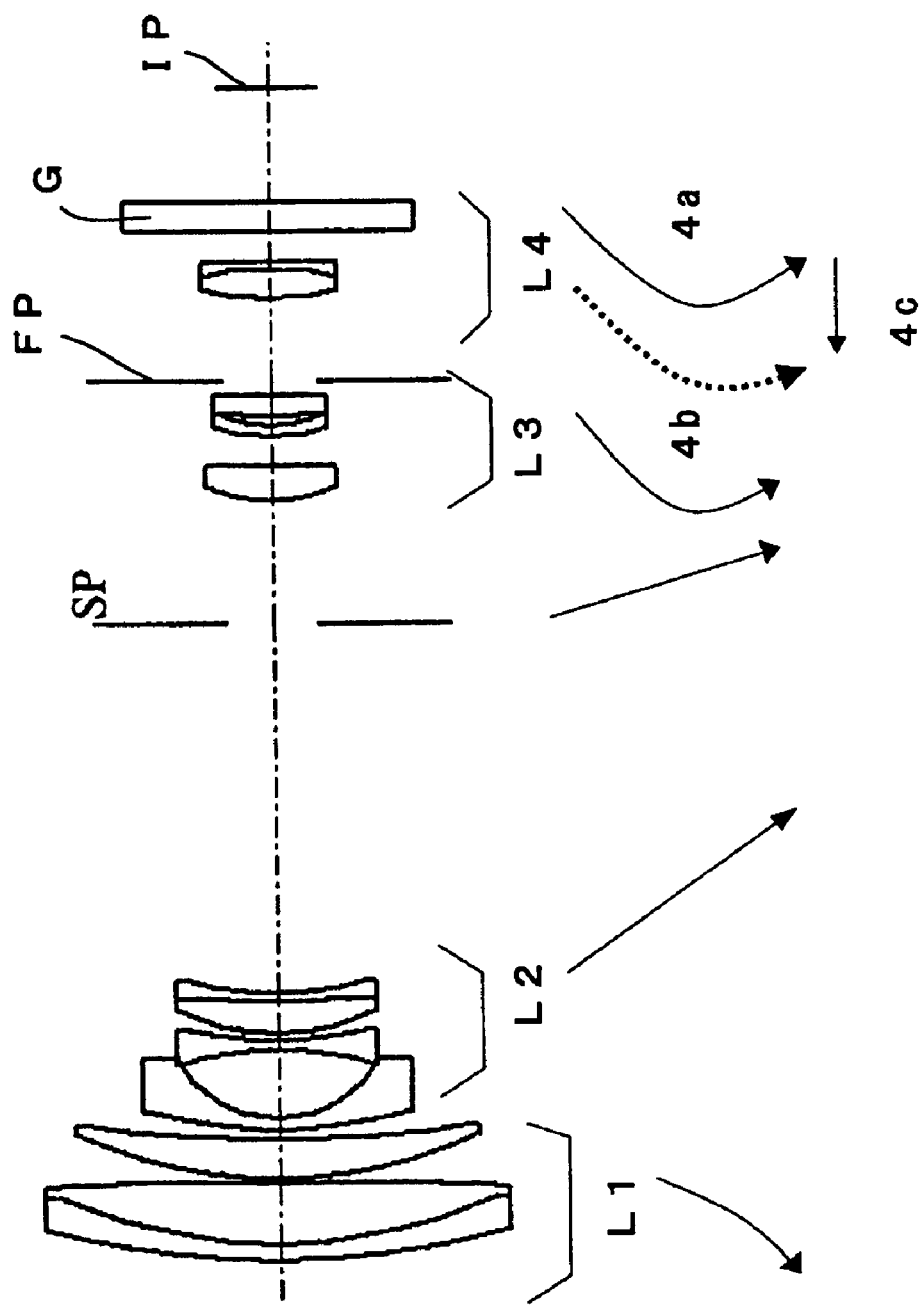
FIG. 8 is a section view showing the zoom lens at the wide-angle end in Embodiment 3.
Figure 9:
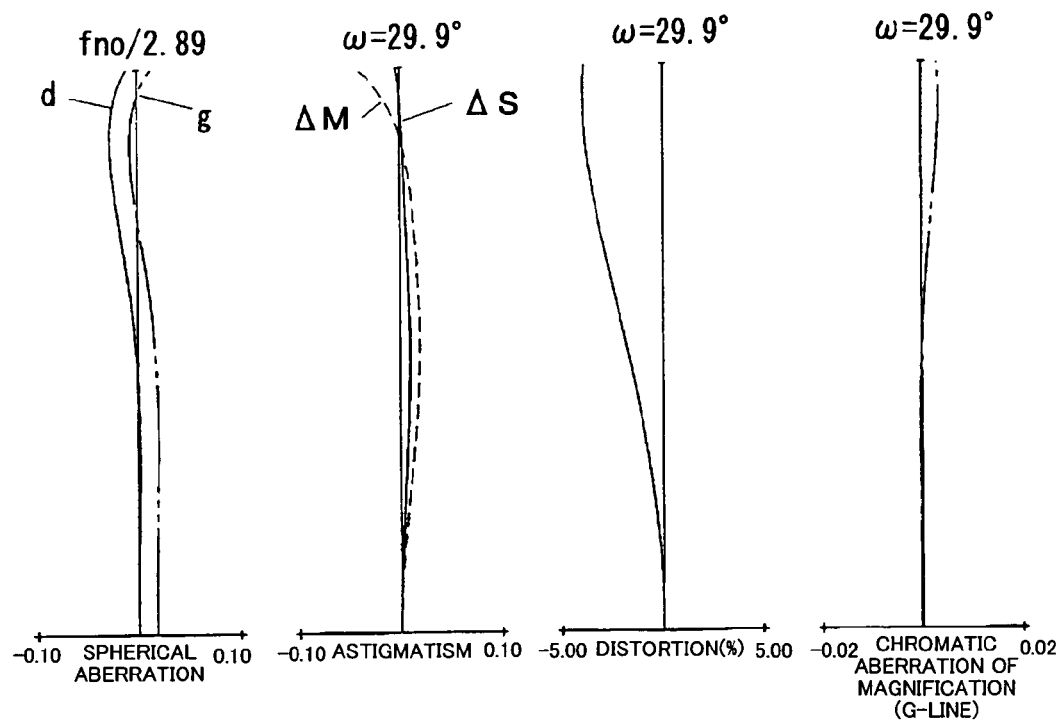
FIG. 9 shows various aberration charts of the zoom lens at the wide-angle end in Embodiment 3.
Figure 10:
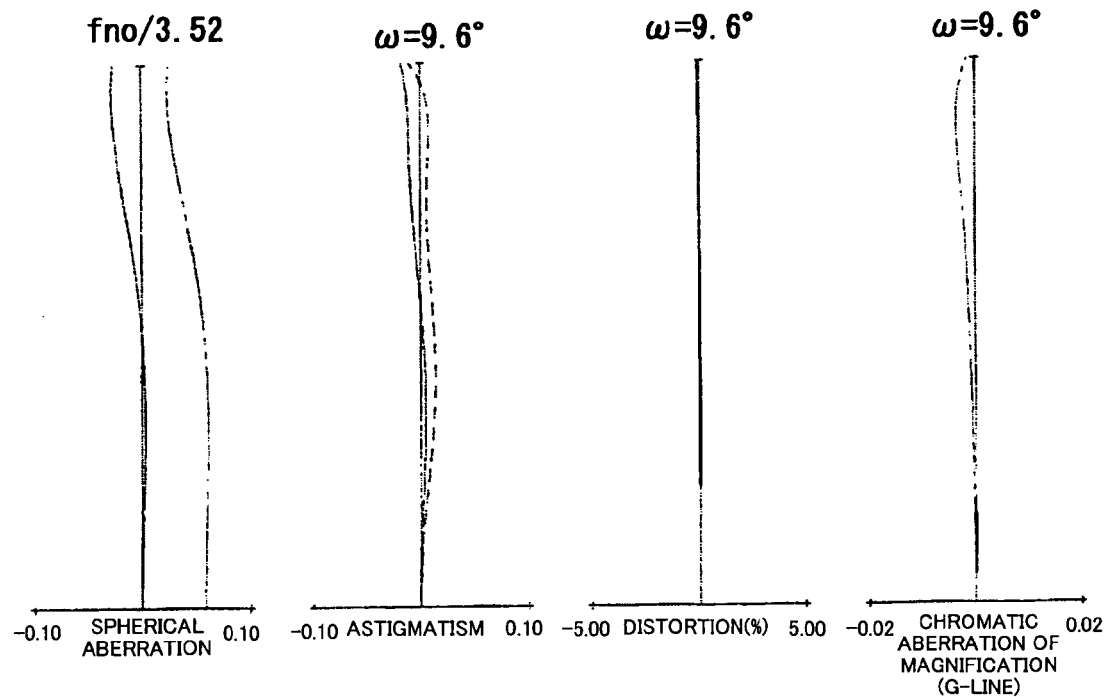
FIG. 10 shows various aberration charts of the zoom lens at the middle zoom position in Embodiment 3.
Figure 11:
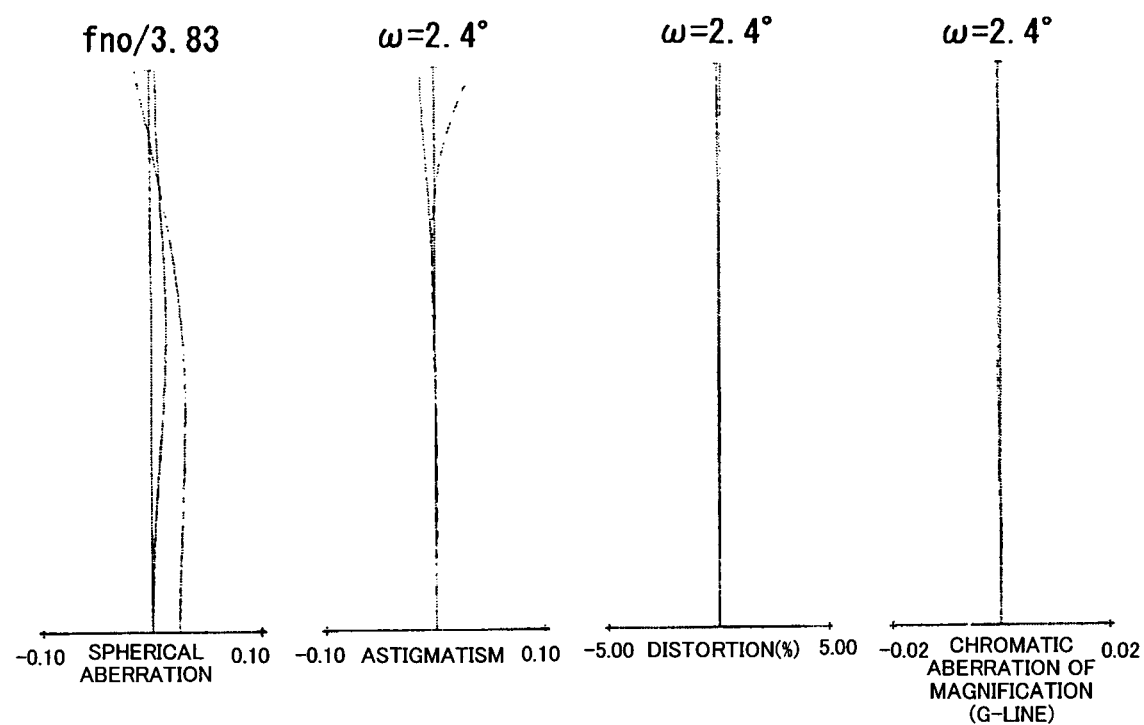
FIG. 11 shows various aberration charts of the zoom lens at the telephoto end in Embodiment 3.

FIG. 8 is a section view of the zoom lens at the wide-angle end in Embodiment 3 of the present invention, and FIGS. 9 to 11 show aberration charts of the zoom lens in Embodiment 3 at the wide-angle end, at the middle focal length and at the telephoto end.

Figure 12:
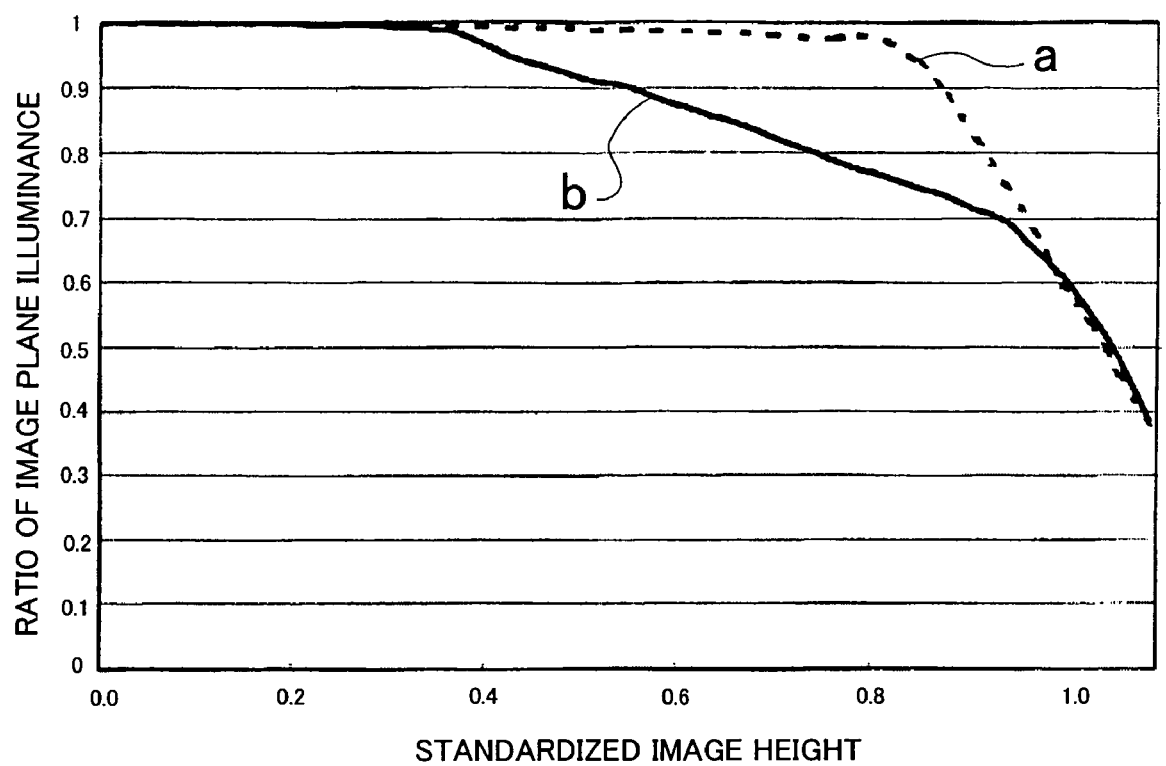
FIG. 12 is a explanation chart of image plane illuminance.

FIG. 12 is a explanation chart of image plane illuminance.

Figure 13:
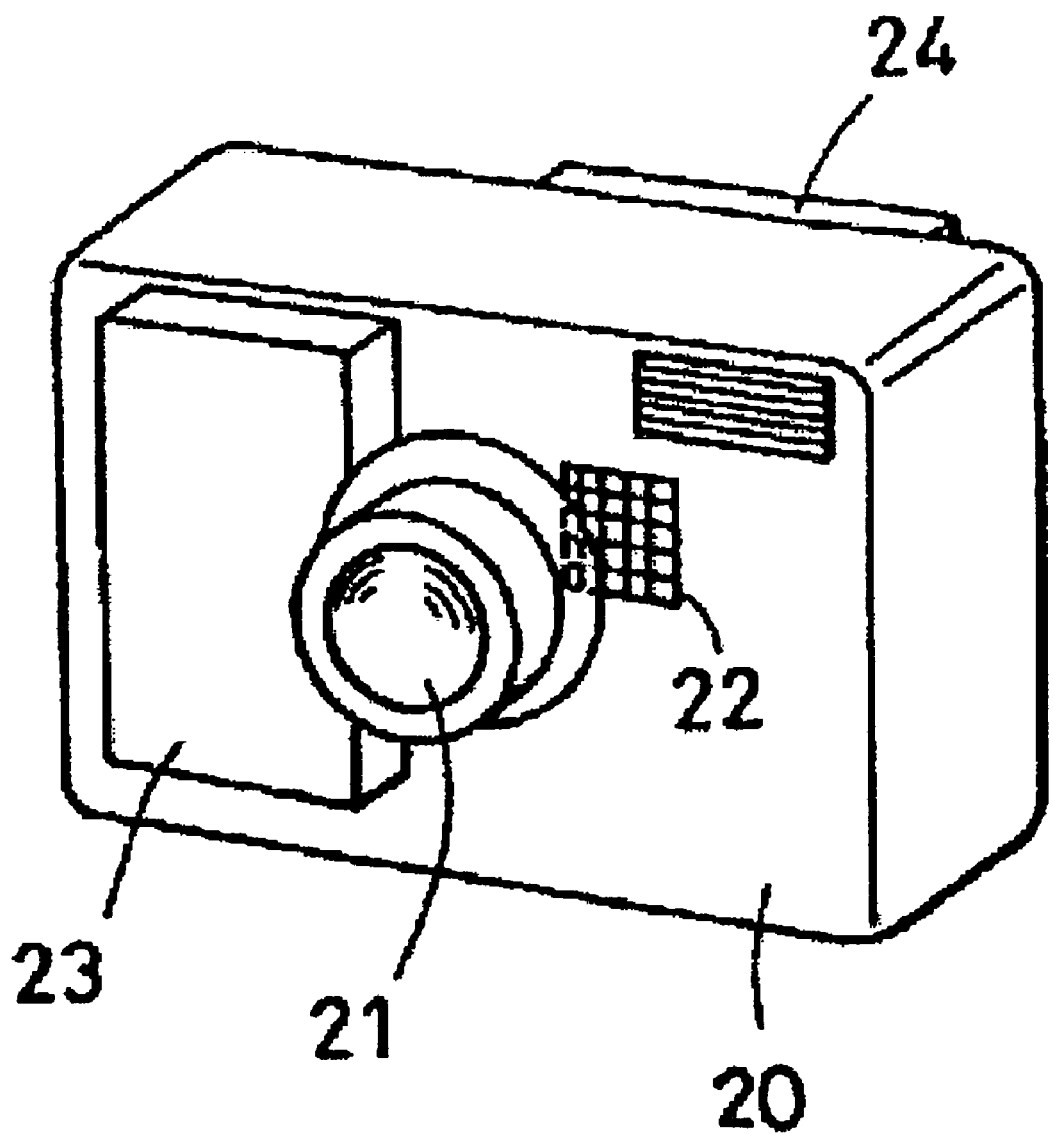
FIG. 13 is a substantial outline view of an image-taking apparatus of the invention.

FIG. 13 is a substantial outline view of the image-taking apparatus of the invention.

In the section views of FIG. 1 and FIG. 8, the symbol L1 denotes a first lens unit with a positive refractive power (optical power; the optical power means the reciprocal of the focal length), the symbol L2 denotes a second lens unit with a negative refractive power, the symbol L3 denotes a third lens unit with a positive refractive power, and the symbol L4 denotes a fourth lens unit with a positive refractive power. The symbol SP denotes an aperture stop. The aperture stop is located in front of the third lens unit L3. The left side in the figures is an object side, and the right side in the figures is an image side.

The symbol G denotes an optical block, provided in optical design and corresponding to an optical filter and face plate, etc. The symbol IP denotes an image plane on which the image pick-up plane of a solid-state image sensor (photoelectric conversion element) such as a CCD sensor or CMOS sensor is located. The symbol FP denotes a flare-cutting stop which is arranged on the image side of the third lens unit L3 and cuts unnecessary light.

In the aberration charts, the symbols d and g denote the d-line and the g-line, and the symbols ΔM and ΔS denote the meridional image plane and the sagittal image plane. The chromatic aberration of magnification is shown by the g-line.

In each embodiment, the aperture stop SP and each of the lens units L1 to L4 are moved like the arrow during zooming from the wide-angle end to the telephoto end.

The zoom positions, where the lens unit for varying the magnification (the second lens unit L2) is located at both ends of the movable range thereof in the direction of the optical axis in the mechanism, are called the wide-angle end and the telephoto end, respectively.

In Embodiments 1 to 3, the first lens unit L1 is moved to the object side and the second lens unit L2 is moved to the image side during zooming from the wide-angle end to the telephoto end. Moreover, the third lens unit L3 is moved along a track convex towards the object side. Furthermore, the fourth lens unit L4 is moved along a track convex towards the object side.

Moreover, the aperture stop SP is moved so as to be located at a position closer to the image side at the telephoto end than at the wide-angle end.

In each embodiment, the rear focus type in which the fourth lens unit L4 is moved on the optical axis for focusing is adopted. In a case of focusing from an infinite object to a short distance object at the telephoto end, the fourth lens unit L4 is moved forward as shown by the arrow 4c in FIGS. 1 and 8. The solid curved line 4a and the dotted curved line 4b of the fourth lens unit L4 show the movement tracks to compensate the image plane fluctuation associated with the variation of magnification from the wide-angle end to the telephoto end in in-focus states to the infinite object and to the short distance object, respectively. In each embodiment, using the lightweight fourth lens unit L4 for focusing facilitates prompt automatic focus detection.

In each embodiment, moving the third lens unit L3 along the track convex towards the object side during zooming prevents the increase of the front lens diameter when the peripheral light quantity is sufficiently secured at the middle zoom position, and thereby the miniaturization of the front lens diameter is achieved.

Since the first lens unit L1 is moved to be located at a position closer to the object side and the second lens unit L2 is moved to be located at a position closer to the image side at the telephoto end than at the wide-angle end, a high zoom ratio can be secured while maintaining the short total length of the zoom lens.

In a zoom lens of four-unit constitution having lens units with a positive, negative, positive and positive refractive powers in order from the object side to the image side, in a case where the stop (aperture stop) is arranged in the vicinity of the third lens unit L3 and the stop is moved together with the third lens unit L3, there is little decrease in the peripheral light quantity in an area up to about the 80 percent height position in the effective image plane from the center of the image plane, as shown by the dotted line a in FIG. 12.

However, there is a steep decrease in the peripheral light quantity in an outer area from about the 80 percent height position in the image plane. Therefore, the decrease of the peripheral light quantity tends to be conspicuous more than in a case where the decrease is gentle.

On the contrary, in the present invention, independently moving the stop SP during zooming and appropriately setting the amount of the movement can reduce the decreasing degree of the light quantity in the peripheral area of the image plane. Since the axial luminous flux is diverged, the aperture diameter of the stop SP can be reduced by moving the stop SP to the object side from the third lens unit L3 in an appropriate amount at the wide-angle end.

Reducing the aperture diameter and arranging the stop SP on the object side can cut a part of rays that reach an area from the 40 percent image-height to about the 80 percent image-height in the effective image plane. Therefore, as shown by the solid line b in FIG. 12, the decreasing degree of the image plane illuminance up to the peripheral portion in the image plane can be gentle by moving the stop SP independently during zooming, and thereby the decrease of the light quantity around the peripheral area in the image plane can be inconspicuous.

In each embodiment, the image-forming position of the entire system is made to displace by moving the third lens unit L3 with the movement component of the direction perpendicular to the optical axis, and thereby the vibration of the image to be taken is corrected when the entire optical system (zoom lens) is shook (inclined), for instance. In each embodiment, the image vibration is corrected without newly adding an optical member such as a variable angle prism or a lens unit for vibration isolation.

The first lens unit L1 is constituted by a cemented lens and a meniscus-shape lens whose object side surface is convex. The cemented lens is made by cementing a meniscus-shape lens having a negative refractive power and whose object side surface is convex and a lens having a positive refractive power.

The second lens unit L2 is constituted by three or four lenses. The lenses are a meniscus-shape lens having a negative refractive power and whose object side surface is convex, a lens having a negative refractive power and whose object side and image side surfaces are concave, and a lens having a positive refractive power or a cemented lens constituted by cementing a lens having a positive refractive power and a lens having a negative refractive power. Thereby, aberration fluctuations during zooming are reduced, and especially, distortion at the wide-angle end and spherical aberration at the telephoto end are corrected excellently.

In Embodiment 3 shown by FIG. 8, a further improvement of chromatic aberration of magnification during zooming is achieved by improving the symmetry of the second lens unit L2 by means of adding a lens having a negative refractive power on the image side of the second lens unit L2, and heightening the achromatic effect for the principal point, as compared with Embodiment 1 shown by FIG. 1.

The third lens unit L3 is constituted by, in order from the object side, a lens having a positive refractive power, a lens having a negative refractive power and a lens having a positive refractive power. Thereby, aberration fluctuations associated with varying the magnification are corrected excellently.

In the present invention, it is preferable that the third lens unit L3 includes at least one lens having a negative refractive power and at least one aspheric surface for reducing the decentration aberration occurred when moving the third lens unit L3 with the movement component of the direction perpendicular to the optical axis for correcting image vibrations associated with a camera-shake, etc.

The correction of the decentered chromatic aberration of magnification is difficult by only a lens having a positive refracting power. Moreover, the aspheric surface is effective for excellently correcting the decentered coma aberration.

The fourth lens unit L4 is constituted by a cemented lens made by cementing a lens having a positive refractive power and a lens having a negative refractive power. Thereby, aberration fluctuations when focusing with the fourth lens unit L4 are reduced.

In each embodiment of the present invention, an optical member having no refractive power or very small refractive power may be arranged on the image side of the fourth lens unit L4 or on the object side of the first lens unit L1.

In each embodiment, one or more of the following conditional expressions is satisfied, and thereby, the effect corresponding to each conditional expression is achieved.

When MS represents the maximum movement amount of the aperture stop SP in the optical axis direction, and M1, M2 and M3 represent the maximum movement amounts of the first, second and third lens units in the optical axis direction (the sign is positive when directing towards from the object side to the image side), respectively, during zooming from the wide-angle end to the telephoto end, and fw and ft represent the focal lengths of the entire system at the wide-angle end and at the telephoto end, respectively, and f2 represents the focal length of the second lens unit L2, the zoom lens satisfies the following conditions:

$$-1.8 < MS/M3 < -0.5 \qquad (1)$$

$$-0.4 < M1/M2 < -0.05 \qquad (2)$$

$$-0.65 < f2/\sqrt{(fw \cdot ft)} < -0.35 \qquad (3)$$

Next, explanations for technical meanings of the above-mentioned conditional expressions will be given.

If the movement amount of the stop SP becomes large so that the value of the conditional expression (1) falls below the lower limit value thereof, F-number will be large at the telephoto end. On the contrary, if the value exceeds the upper limit value, the peripheral light quantity decreases greatly in the peripheral area in the image plane, and it is not good because the improvement effect of the peripheral light quantity is not obtained enough.

In addition, it is preferable that the range of the conditional expression (1) is set to:

$$-01.2 < MS/M3 < -0.68. \quad (1a)$$

Thereby, it becomes easy to further improve the decrease of F-number and the peripheral light quantity at the telephoto end.

If the movement amount of the first lens unit L1 becomes small so that the value of the conditional expression (2) exceeds the upper limit value thereof, the reducing effect of the total length of the zoom lens at the wide-angle end and the downsizing effect of the front lens diameter become insufficient. On the contrary, if the movement amount of the first lens unit L1 becomes large so that the value falls below the lower limit value, it is not good because a cam track to move the first lens unit L1 becomes steep and the lens barrel structure becomes complex.

In addition, it is preferable that the range of the conditional expression (2) is set to:

$$-0.25 < M1/M2 < -0.1. \quad (2a)$$

Thereby, the further miniaturization of the entire optical system and the simplification of the lens barrel structure such as the decrease of the cam track's curve angle can be achieved.

The conditional expression (3) shows the condition to achieve shortening the total length of the zoom lens while maintaining the excellent optical performance.

If the refractive power of the second lens unit L2 becomes small so that the value of the conditional expression (3) exceeds the upper limit value thereof, it is not good because deterioration in the optical performance by the influence of the manufacturing error and the image shift at the time of variation of the magnification become large. On the contrary, if the value falls below the lower limit value, since the movement amount of the lens, required for zooming, becomes too large, the miniaturization of the total length of the zoom lens becomes difficult.

In addition, it is preferable that the range of the conditional expression (3) is set to:

$$-0.55 < f2/\sqrt{(fw \cdot ft)} < -0.43 \quad (3a)$$

Thereby, the maintenance of the optical performance and the miniaturization of the entire length of the zoom lens can be further effectively achieved.

In the case where the third lens unit L3 is moved with the movement component of the direction perpendicular to the optical axis for displacing the image-forming position, when SH represents the maximum movement amount of the third lens unit L3 in the direction perpendicular to the optical axis, ft represents the focal length of the entire system at the telephoto end, $\Delta I$ represents the displacement amount of the image-forming position on the image plane, which corresponds to the movement amount $\Delta L$ of the third lens unit L3 in the direction perpendicular to the optical axis at the telephoto end, and TS represents the decentering sensitivity, TS being equal TS=$\Delta I/\Delta L$, the zoom lens satisfies the following condition:

$$0.0017 < SH \cdot TS/ft < 0.03 \quad (4)$$

In each embodiment, the image vibration is corrected when the camera or the optical system shakes by moving the third lens unit L3 with the movement component of the direction perpendicular to the optical axis. At this time, the load of the actuator driving the third lens unit L3 is decreased by correcting the image vibration with the third lens unit L3 which is comparatively lightweight. Furthermore the miniaturization of the outer diameter of the lens barrel is achieved.

The conditional expression (4) shows the condition in this case for appropriately setting the decentering sensitivity TS of the third lens unit L3 at the telephoto end and the maximum movement amount of the third lens unit L3 in the direction perpendicular to the optical axis.

If the value of the conditional expression (4) falls below the lower limit value thereof, it is not good because the sufficient effect of the correction of the image vibration is not obtained. On the other hand, if the value exceeds the upper limit value, it is not good because the asymmetry of the peripheral light quantity at the time of the correction of the image vibration stands out or the decentration aberration becomes large.

It is preferable that the first lens unit L1 includes a positive lens element made of a material which satisfies the following conditional expression (5), when Ng, Nd, NF and NC represent refractive indices of the material for the g-line, d-line, F-line and C-line, and $$vd = \frac{Nd - 1}{NF - NC}$$

$$\theta gf = \frac{Ng - NF}{NF - NC},$$

$$\theta gf - A \vee d - B > 0.001$$

$$A = -0.001609, B = 0.641348. \quad (5)$$

The conditional expression (5) shows the condition for correcting the chromatic aberration, especially the second-order spectrum at the telephoto end. If the value of the conditional expression (5) falls below the lower limit value thereof, it is not good because the correction of the axial chromatic aberration and the chromatic aberration of magnification at the telephoto end becomes insufficient.

Next, Numeric Examples 1 to 3 of the present invention will be shown. In each numeric example, the symbol i denotes the order of optical surfaces from the object side, and the symbol Ri denotes the radius of curvature of the i-th optical surface (i-th surface). The symbol Di denotes a distance between the i-th surface and the (i+1)-th surface, and the symbols Ni and vi denote the refractive index and Abbe's number of the material of the i-th optical member with reference to the d-line, respectively. When the symbol k denotes the conic constant, and the symbols B, C, D, E, A', B', and C' denote the aspheric coefficients, and the symbol x denotes the displacement of the optical surface in the direction of the optical axis at the position of h in height from the optical axis with reference to the surface apex, the aspheric shape is shown with:

$$x = (h^2/R)/[1 + \{1 - (1+k)(h/R)^2\}^{1/2}] + Bh^4 + Ch^4 + Dh^8 + Eh^{10} + A'h^3 + B'h^5 + C'h^7$$

where the symbol R denotes the radius of curvature.

Moreover, the symbol "e-Z" means "$10^{-Z}$", for instance. Furthermore, the correspondence in each numeric examples with the conditional expressions mentioned above is shown in Table 1. The symbol f denotes the focal length, the symbol Fno denotes F-number, and the symbol $\omega$ denotes a half field angle.

The symbols R23 and R24 in Numeric Examples 1 and 2 and the symbols R24 and R25 in Numeric Example 3 denote glass blocks such as a filter, etc.

| f = 6.18~71.60 | F n o = 2.88~3.72 | 2ω = 59.8°~5.6° | |
|---|---|---|---|
| R1 = 61.271 | D1 = 1.40 | N1 = 1.846660 | ν1 = 23.9 |
| R2 = 35.239 | D2 = 4.15 | N2 = 1.496999 | ν2 = 81.5 |
| | | | θgf = 0.537 |
| R3 = −727.318 | D3 = 0.20 | | |
| R4 = 32.370 | D4 = 2.96 | N3 = 1.772499 | ν3 = 49.6 |
| R5 = 87.455 | D5 = VARIABLE | | |
| R6 = 41.747 | D6 = 0.90 | N4 = 1.834000 | ν4 = 37.2 |
| R7 = 8.157 | D7 = 4.28 | | |
| R8 = −31.353 | D8 = 0.65 | N5 = 1.603112 | ν5 = 60.6 |
| R9 = 20.990 | D9 = 0.80 | | |
| R10 = 15.447 | D10 = 2.00 | N6 = 1.922860 | ν6 = 18.9 |
| R11 = 40.804 | D11 = VARIABLE | | |
| R12 = STOP | D12 = 9.20 | | |
| R13 = 10.310 | D13 = 2.70 | N7 = 1.583126 | ν7 = 59.4 |
| (ASPHERIC) | | | |
| R14 = −113.723 | D14 = 2.30 | | |
| R15 = 13.851 | D15 = 0.70 | N8 = 1.846660 | ν8 = 23.9 |
| R16 = 8.337 | D16 = 0.80 | | |
| R17 = 30.907 | D17 = 1.60 | N9 = 1.487490 | ν9 = 70.2 |
| R18 = 87.748 | D18 = 1.16 | | |
| R19 = ∞ | D19 = VARIABLE | | |
| R20 = 21.290 | D20 = 2.40 | N10 = 1.696797 | ν10 = 55.5 |
| R21 = −17.369 | D21 = 0.60 | N11 = 1.846660 | ν11 = 23.9 |
| R22 = −53.522 | D22 = VARIABLE | | |
| R23 = ∞ | D23 = 2.20 | N12 = 1.516330 | ν12 = 64.1 |
| R24 = ∞ | | | |

| VARIABLE | FOCAL LENGTH | | |
|---|---|---|---|
| DISTANCE | 6.18 | 33.44 | 71.60 |
| D5 | 0.80 | 24.62 | 32.13 |
| D11 | 26.12 | 7.57 | 2.33 |
| D19 | 4.75 | 4.27 | 10.19 |
| D22 | 2.30 | 7.06 | 0.73 |

ASPHERIC COEFFICIENT

R13　k = 4.61172e−2　B = 3.98419e−5　C = 2.78470e−5　D = 9.74510e−8　E = 2.20007e−9
　　　A' = −9.39953e−5　B' = −9.24552e−5　C' = −3.75811e−6

MAXIMUM SHIFT AMOUNT SH = 0.39554

| f = 6.18~71.60 | F n o = 2.89~3.72 | 2ω = 59.8°~5.6° | |
|---|---|---|---|
| R1 = 61.700 | D1 = 1.40 | N1 = 1.846660 | ν1 = 23.9 |
| R2 = 33.739 | D2 = 4.20 | N2 = 1.487490 | ν2 = 70.2 |
| | | | θgf = 0.530 |
| R3 = −898.423 | D3 = 0.20 | | |
| R4 = 32.450 | D4 = 3.00 | N3 = 1.772499 | ν3 = 49.6 |
| R5 = 99.562 | D5 = VARIABLE | | |
| R6 = 36.566 | D6 = 0.90 | N4 = 1.834000 | ν4 = 37.2 |
| R7 = 7.869 | D7 = 4.26 | | |
| R8 = −27.388 | D8 = 0.65 | N5 = 1.603112 | ν5 = 60.6 |
| R9 = 21.339 | D9 = 0.80 | | |
| R10 = 15.410 | D10 = 2.00 | N6 = 1.922860 | ν6 = 18.9 |
| R11 = 41.628 | D11 = VARIABLE | | |
| R12 = STOP | D12 = 8.20 | | |
| R13 = 10.350 | D13 = 2.70 | N7 = 1.583126 | ν7 = 59.4 |
| (ASPHERIC) | | | |
| R14 = −145.235 | D14 = 2.30 | | |
| R15 = 13.635 | D15 = 0.70 | N8 = 1.846660 | ν8 = 23.9 |
| R16 = 8.331 | D16 = 0.80 | | |
| R17 = 34.335 | D17 = 1.60 | N9 = 1.487490 | ν9 = 70.2 |
| R18 = 127.356 | D18 = 1.16 | | |
| R19 = ∞ | D19 = VARIABLE | | |
| R20 = 22.014 | D20 = 2.40 | N10 = 1.696797 | ν10 = 55.5 |
| R21 = −15.869 | D21 = 0.60 | N11 = 1.846660 | ν11 = 23.9 |
| R22 = −44.811 | D22 = VARIABLE | | |
| R23 = ∞ | D23 = 2.20 | N12 = 1.516330 | ν12 = 64.1 |
| R24 = ∞ | | | |

-continued

| VARIABLE | FOCAL LENGTH | | |
|---|---|---|---|
| DISTANCE | 6.18 | 33.00 | 71.60 |
| D5 | 0.80 | 24.57 | 32.40 |
| D11 | 25.70 | 7.32 | 2.14 |
| D19 | 5.04 | 4.08 | 9.86 |
| D22 | 2.30 | 7.53 | 1.35 |

ASPHERIC COEFFICIENT

R13  $k = 1.18699e-1$  $B = 3.73897e-5$  $C = 2.82019e-5$  $D = 9.92306e-8$  $E = 2.14516e-9$
     $A' = -9.45131e-5$  $B' = -9.38973e-5$  $C' = -3.80754e-6$

MAXIMUM SHIFT AMOUNT SH = 0.27019

$f = 6.18 \sim 84.99$   $F n o = 2.89 \sim 3.83$   $2\omega = 59.8° \sim 4.8°$

| R1 = 62.442 | D1 = 1.40 | N1 = 1.846660 | ν1 = 23.9 |
| R2 = 38.194 | D2 = 4.80 | N2 = 1.438750 | ν2 = 95.0 |
| | | | θgf = 0.534 |
| R3 = −293.365 | D3 = 0.20 | | |
| R4 = 34.133 | D4 = 2.96 | N3 = 1.772499 | ν3 = 49.6 |
| R5 = 89.625 | D5 = VARIABLE | | |
| R6 = 36.111 | D6 = 0.90 | N4 = 1.806100 | ν4 = 33.3 |
| R7 = 8.347 | D7 = 5.30 | | |
| R8 = −22.065 | D8 = 0.75 | N5 = 1.518229 | ν5 = 58.9 |
| R9 = 29.872 | D9 = 0.50 | | |
| R10 = 16.281 | D10 = 2.50 | N6 = 1.922860 | ν6 = 18.9 |
| R11 = 117.153 | D11 = 0.70 | N7 = 1.698947 | ν7 = 30.1 |
| R12 = 26.862 | D12 = VARIABLE | | |
| R13 = STOP | D13 = 9.60 | | |
| R14 = 10.957 | D14 = 2.70 | N8 = 1.583126 | ν8 = 59.4 |
| (ASPHERIC) | | | |
| R15 = −147.576 | D15 = 2.30 | | |
| R16 = 15.075 | D16 = 0.70 | N9 = 1.846660 | ν9 = 23.9 |
| R17 = 8.975 | D17 = 0.80 | | |
| R18 = 30.045 | D18 = 1.60 | N10 = 1.487490 | ν10 = 70.2 |
| R19 = 93.659 | D19 = 1.16 | | |
| R20 = ∞ | D20 = VARIABLE | | |
| R21 = 20.797 | D21 = 2.40 | N11 = 1.696797 | ν11 = 55.5 |
| R22 = −18.374 | D22 = 0.60 | N12 = 1.846660 | ν12 = 23.9 |
| R23 = −56.850 | D23 = VARIABLE | | |
| R24 = ∞ | D24 = 2.20 | N13 = 1.516330 | ν13 = 64.1 |
| R25 = ∞ | | | |

| VARIABLE | FOCAL LENGTH | | |
|---|---|---|---|
| DISTANCE | 6.18 | 35.11 | 84.99 |
| D5 | 0.80 | 26.81 | 35.03 |
| D12 | 28.69 | 8.24 | 2.47 |
| D20 | 6.36 | 6.10 | 13.85 |
| D23 | 2.30 | 7.11 | −0.99 |

ASPHERIC COEFFICIENT

R13  $k = -8.84565e-1$  $B = 1.02238e-4$  $C = 1.98882e-5$  $D = 3.57873e-7$  $E = -2.41046e-9$
     $A' = -7.69796e-5$  $B' = -5.82230e-5$  $C' = -3.81536e-6$

MAXIMUM SHIFT AMOUNT SH = 0.78325

TABLE 1

| CONDITIONAL EXPRESSION | | NUMERIC EXAMPLE | | |
|---|---|---|---|---|
| | | 1 | 2 | 3 |
| (1) | MS/M3 | −1.017 | −0.758 | −0.952 |
| (2) | M1/M2 | −0.130 | −0.192 | −0.132 |
| (3) | $f2/\sqrt{(fw \cdot ft)}$ | −0.515 | −0.499 | −0.487 |
| (4) | SH · TS/ft | 0.00524 | 0.00349 | 0.00873 |
| (5) | θgf−Avd−B | 0.0274 | 0.0017 | 0.0456 |

Next, an embodiment of a digital still camera, which uses the zoom lens shown in Embodiments 1 to 3 as an image-taking optical system, will be explained by using FIG. 13.

In FIG. 13, the numerical symbol 20 denotes a main body of the camera, the numerical symbol 21 denotes an image-taking optical system constituted by the zoom lens that has been explained in Embodiment 1 to 3, the numerical symbol 22 denotes a solid state image pick-up element (photoelectric conversion element), such as a CCD sensor and CMOS sensor, etc., which is built in the main body 20 and receives the object image formed by the image-taking optical system 21. The numerical symbol 23 denotes a memory that stores the information corresponding to the object image, which has been photoelectric-converted by the solid-state image pick-up element 22. The numerical symbol 24 denotes a viewfinder for to observing the object image formed on the solid-state image pick-up element 22, which is constituted by a liquid crystal display panel, etc.

As described above, by applying the zoom lens of the present invention to an optical apparatus such as a digital still camera, etc., an optical apparatus, which is compact and has high optical performance, can be achieved.

This application claims priority from Japanese Patent Application No. 2004-022741 filed on Jan. 30, 2004, which is hereby incorporated by reference herein.

What is claimed is:

1. A zoom lens system comprising, in order from an object side to an image side:
   a first lens unit having a positive optical power;
   a second lens unit having a negative optical power;
   an aperture stop;
   a third lens unit having a positive optical power; and
   a fourth lens unit having a positive optical power,
   wherein the first, second, third and fourth lens units are moved during zooming, the aperture stop is moved so as to be located closer at a position closer to the image side at a telephoto end than at a wide-angle end, and
   wherein the following condition is satisfied:

$-1.8 < MS/M3 < -0.5$ where MS and M3 represent the maximum movement amounts of the aperture stop and the third lens unit in a direction of an optical axis during zooming from the wide-angle end to the telephoto end, respectively.

2. The zoom lens system according to claim 1, wherein the third lens unit is moved along a track convex towards the object side during zooming from the wide-angle end to the telephoto end.

3. The zoom lens system according to claim 1, wherein the following condition is further satisfied:

$-0.4 < M1/M2 < -0.05$ where M1 and M2 represent the maximum movement amounts of the first lens unit and the second lens unit in the direction of the optical axis during zooming from the wide-angle end to the telephoto end, respectively.

4. The zoom lens system according to claim 1, wherein the fourth lens unit is moved for focusing.

5. The zoom lens system according to claim 1, wherein the following condition is further satisfied:

$-0.65 < f2/\sqrt{(fw \cdot ft)} < -0.35$ where fw and ft represent focal lengths of the entire system at the wide-angle end and at the telephoto end, respectively, and f2 represents a focal length of the second lens unit.

6. The zoom lens system according to claim 1, wherein the third lens unit is movable so as to have a movement component of a direction perpendicular to the optical axis, an image-forming position is displaced by the movement of the third lens unit with the movement component of the direction perpendicular to the optical axis, and the the following condition is further satisfied:

$0.0017 < SH \cdot TS/ft < 0.03$ where SH represents the maximum movement amount of the third lens unit in the direction perpendicular to the optical axis, ft represents a focal length of the entire system at the telephoto end, ΔI represents a displacement amount of the image-forming position when the movement amount of the third lens unit in the direction perpendicular to the optical axis at the telephoto end is ΔL, and TS represents a decentering sensitivity, TS being equal to ΔI/ΔL.

7. The zoom lens system according to claim 1, wherein the first lens unit includes a positive lens element made of a material which satisfies the following condition:

$\theta gf - A \nu d - B > 0.001$ $A = -0.001609, B = 0.641348$ where $$\nu d = \frac{Nd - 1}{NF - NC}$$

$$\theta gf = \frac{Ng - NF}{NF - NC}$$

and where Ng, Nd, NF and NC represent refractive indices of the material for the g-line, d-line, F-line and C-line.

8. The zoom lens system according to claim 1, wherein the zoom lens system forms an image on a solid-state image pick-up element.

9. An image-taking apparatus comprising:
   the zoom lens system according to claim 1; and
   a solid-state image pick-up element which receives an image formed by the zoom lens system.

10. An image-taking apparatus comprising:
    the zoom lens system according to claim 1; and
    a solid-state image pick-up element receives an image formed by the zoom lens system.

11. A zoom lens system comprising, in order from an object side to an image side:
    a first lens unit having a positive optical power;
    a second lens unit having a negative optical power;
    an aperture stop;
    a third lens unit having a positive optical power; and
    a fourth lens unit having a positive optical power,
    wherein, during zooming from a wide-angle end to a telephoto end, the aperture stop is moved to the image side and the third lens unit is moved along a track convex towards the object side, and
    wherein the following condition is satisfied:

$-1.8 < MS/M3 < -0.5$ where MS and M3 represent the maximum movement amounts of the aperture stop and the third lens unit in a direction of an optical axis during zooming from the wide-angle end to the telephoto end, respectively.

12. The zoom lens system according to claim 10, wherein the first and second lens units are moved during zooming, and the following condition is further satisfied:

$$-0.4 < M1/M2 < -0.05$$

where M1 and M2 represent the maximum movement amounts of the first lens unit and the second lens unit in the direction of the optical axis during zooming from the wide-angle end to the telephoto end, respectively.

13. The zoom lens system according to claim 10, wherein the following condition is further satisfied:

$$-0.65 < f2/\sqrt{(fw \cdot ft)} < -0.35$$

where fw and ft represent focal lengths of the entire system at the wide-angle end and at the telephoto end, respectively, and f2 represents a focal length of the second lens unit.

14. The zoom lens system according to claim 10, wherein the zoom lens system forms an image on a solid-state image pick-up element.

* * * * *

UNITED STATES PATENT AND TRADEMARK OFFICE
CERTIFICATE OF CORRECTION

| | |
|---|---|
| PATENT NO. | : 7,088,522 B2 |
| APPLICATION NO. | : 11/040850 |
| DATED | : August 8, 2006 |
| INVENTOR(S) | : Hiroyuki Hamano |

It is certified that error appears in the above-identified patent and that said Letters Patent is hereby corrected as shown below:

On the Title Page

Item "(56) References Cited",

Subsection, "U.S. PATENT DOCUMENTS",

"6,456,441 B1" should read    --6,456,441 B2--

Signed and Sealed this

Nineteenth Day of December, 2006

JON W. DUDAS
*Director of the United States Patent and Trademark Office*